(12) United States Patent
Clark

(10) Patent No.: US 7,593,613 B1
(45) Date of Patent: Sep. 22, 2009

(54) INTEGRATED FIBER FISH

(75) Inventor: Joseph R. Clark, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/114,030

(22) Filed: May 2, 2008

(51) Int. Cl.
G02B 6/46 (2006.01)
(52) U.S. Cl. .......................................... 385/135; 385/147
(58) Field of Classification Search ................. 385/135, 385/113, 147
See application file for complete search history.

(56) References Cited

U.S. PATENT DOCUMENTS 5,966,492 A * 10/1999 Bechamps et al. .......... 385/135
6,483,978 B1 * 11/2002 Gao et al. ................... 385/135

\* cited by examiner

*Primary Examiner*—Jerry T Rahll
(74) *Attorney, Agent, or Firm*—Lewinski Law Group LLC

(57) ABSTRACT

In one embodiment, an electronics chassis with an integrated fiber fish configured to move fiber optic cable between the front and rear of the chassis. The fiber fish may be movably coupled to the chassis housing and releasably hold fiber optic cable for movement along a pathway through the chassis housing.

24 Claims, 17 Drawing Sheets

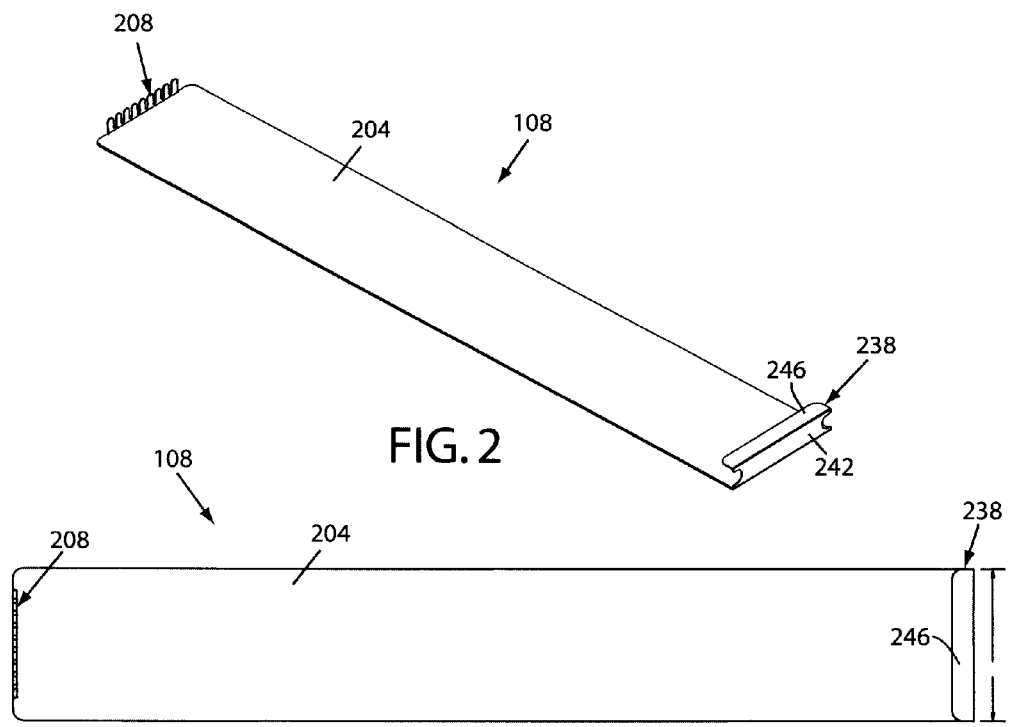
FIG. 2
FIG. 3
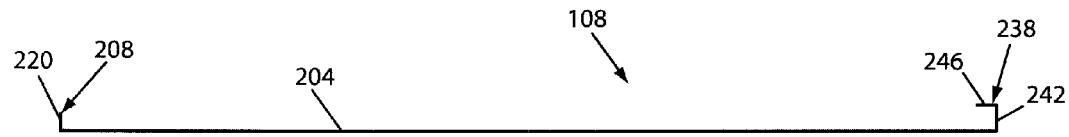
FIG. 4
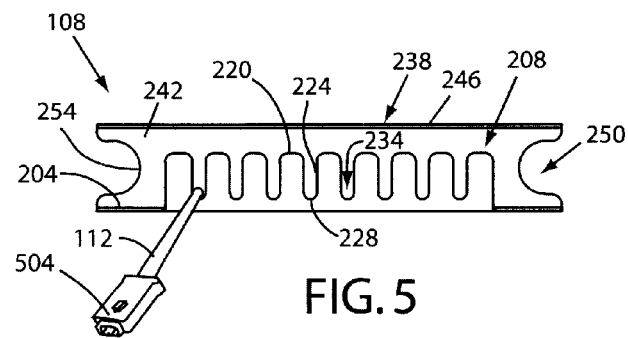
FIG. 5

INTEGRATED FIBER FISH

TECHNICAL FIELD

The present disclosure relates generally to chassis for housing electronic components and managing fiber optic cable.

BACKGROUND

Chassis are often used in the cable television industry for storing various electronic components and managing associated cables. For example, central office or headend locations typically include a plurality of mechanical chassis that are mounted in a rack to house electronics such as optical transmitters, receivers, amplifiers, couplers and switches. Various cables, such as fiber optic cables and RF cables are routed to the electronics.

The electronic devices are typically tightly packed into the chassis, thereby making cable management within the chassis difficult. For example, running a fiber optical cable between the front and rear of a chassis is difficult to accomplish by hand due to the length of the chassis and the limited space available within the chassis. This often forces an operator to use a specialized tool to route the cable.

OVERVIEW

In an example embodiment, an electronics chassis includes a housing and a fiber fish movably coupled to the housing for moving fiber optic cable through the chassis. In an example embodiment, the housing includes a pathway extending through the center of the housing and a fiber fish coupled to the housing that is moveable along the pathway. The pathway may have open ends, or mouths, at the front and rear of the chassis to allow an operator access to fiber optic cable held by the fiber fish. The chassis may also include a fiber trough provided at the front of the chassis that intersects the mouth so that fiber optic cable within the trough can be guided down the pathway. The fiber fish may be configured to releasably hold fiber optic cable so that the fiber fish can move the fiber optic cable along the pathway through the housing between the front and rear of the chassis where it is accessible at the front and rear mouth. Curved walls may also be provided at a mouth of the pathway to provide a desired bend radius to fiber optic cable routed through the chassis and prevent damage to the fiber optic cable.

An example embodiment of a fiber fish for use with the chassis includes an elongated body having a fiber holder at a first end of the body configured to releasably hold fiber optic cable therein. The fiber holder may comprise a plurality of upwardly extending spaced apart fingers, the space between the fingers defining a plurality of receiving troughs for receiving and releasably holding fiber optic cable therein. In an example embodiment, the fiber fish further includes a handle at an opposite end of the body from the fiber holder, the handle configured to engage a portion of the housing when the fiber fish is in a retracted position. The handle may have a profile similar to that of a front wall of a fiber trough provided at the front of the chassis so that the handle can releasably engage the fiber trough and be moved between an engaged retracted position in which the fiber holder is at the rear of the chassis and a disengaged extended position in which the fiber holder is at the front of the chassis.

BRIEF DESCRIPTION OF THE DRAWINGS

FIG. 2 shows a perspective view on an example fiber fish for managing fiber optic cable.

FIG. 3 shows a top view on an example fiber fish for managing fiber optic cable within an electronics chassis.

FIG. 4 shows a top view on an example fiber fish of FIG. 3 for managing fiber optic cable within an electronics chassis.

FIG. 5 shows a rear view on an example fiber fish of FIG. 3 for managing fiber optic cable within an electronics chassis.

DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided to make this disclosure thorough and complete, and to fully convey the scope of the invention to those skilled in the art. The present invention is described more fully hereinbelow.

Figure 1:
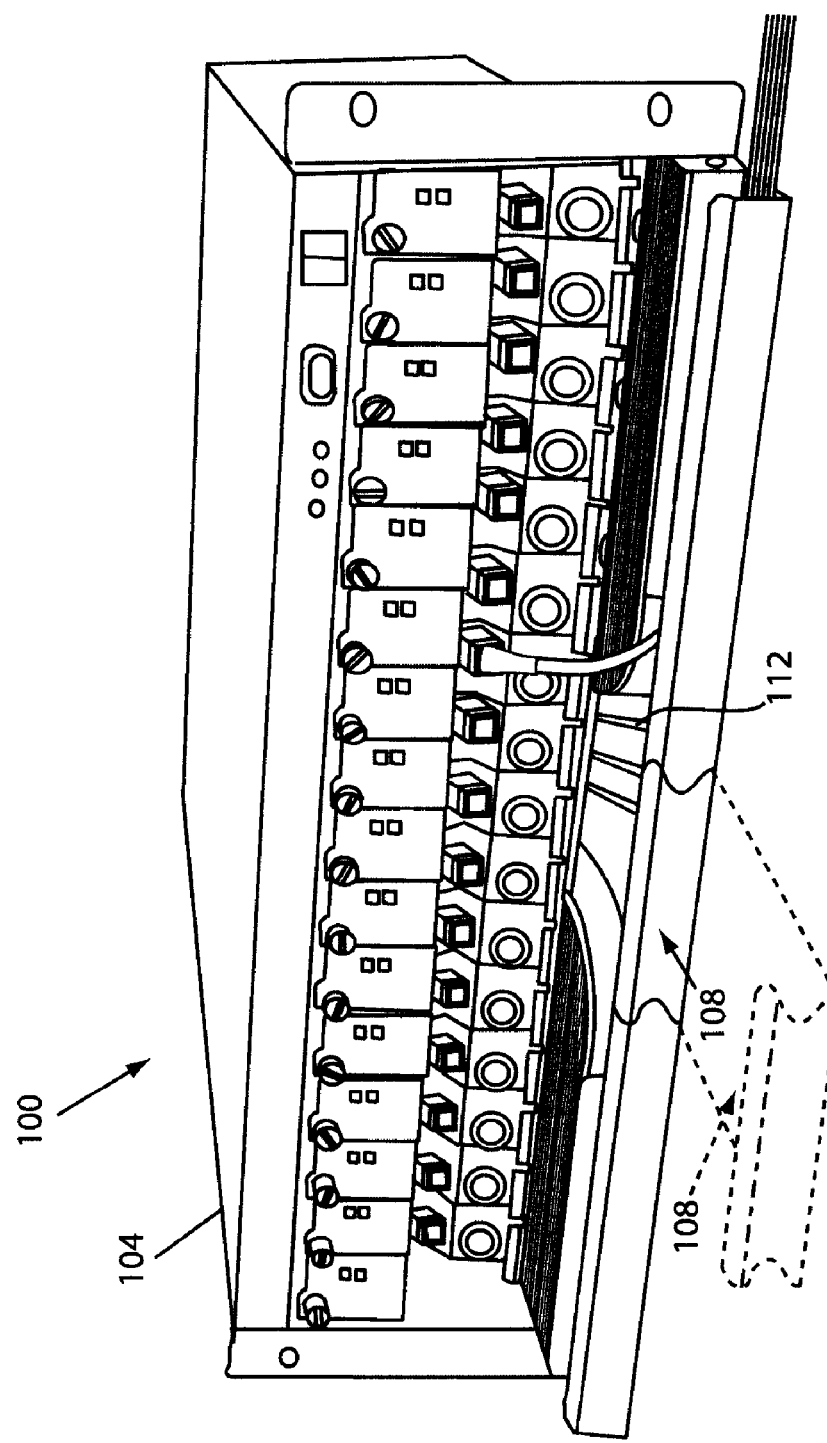
FIG. 1 illustrates a perspective view of an example chassis for managing fiber optic cable.

Turning to the figures, FIG. 1 illustrates a perspective view of a chassis 100 having a housing 104 for holding electronics and an integrated fiber fish 108 for managing fiber optic cable 112. The fiber fish 108 is adjustable between a first position shown in solid lines in FIG. 1, also referred to as an engaged or retracted position, and a second position shown in dashed lines, also referred to as a disengaged or extended position, in which the fiber fish 108 extends from the front of the chassis 100. As discussed in more detail below, the fiber fish 108 may be used to move fiber optical cable 112 through the housing 104 between the front and rear of the chassis 100.

As best seen in FIGS. 2-5, in an example embodiment the fiber fish 108 may include a flat elongated body 204, such as a thin flat sheet of metal. A fiber holder 208 is provided at a first end of the body 204 and is configured for releasably holding fiber optic cable 112. In the example embodiment of FIGS. 2-5 the fiber holder 208 is in the form of a plurality of spaced-apart upwardly extending fingers 220 having sides 224. The sides 224 of adjacent fingers 220 and a curved bottom 228 define receiving troughs 234 between the fingers 220, for releasably holding fiber optic cable 112. The fingers 220 may be spaced apart a distance so as to receive a fiber optic cable 112 of a desired size, such as industry standard 3 mm jacketed optical fiber commonly used at headends. The bottom 228 of the trough 234 may have smooth edges to prevent damage to the cables 112 extending therethrough.

To releasably hold fiber optic cable with the fiber fish 108, an operator can extend a connector 504 attached to the fiber optic cable 112 beyond the fiber holder 208 so that the connector 504 is placed on one side of the extending fingers 220 with the fiber optic cable 112 extending through a receiving trough 234 to an opposite side (FIG. 5) of the fiber holder 208. In an example embodiment the fiber trough 234 has a width that is wider than the diameter of the fiber optic cable 112 but narrower than the width of the connector 504 so that when the fiber fish 108 is moved the connector 504 is prevented from moving through the trough 234 by abutting adjacent extending fingers 220, thereby preventing the fiber optic cable 112 from slipping from the fiber trough 234. In the example embodiment shown in FIG. 5, a connector 504 extends beyond the fiber holder 208 in a first direction as if coming out of the page. Alternatively, the connector 250 and associated fiber optic cable 112 could be draped over the fiber holder 208 in the opposite direction. The connector 504 and cable are shown in FIG. 5 as an SC-APC connector and 3 mm fiber optic cable, respectively, but other connectors and cables could be used and the fiber holder 208 may configured to accommodate such cables and connectors.

As also seen in FIGS. 2-5, a handle 238 may be provided at an opposite end of the fish body 204 from the fiber holder 208 for grasping by an operator. The handle 238 may include an upwardly extending handle main wall 242 and a generally horizontal tab 246 extending inward from the top of the main wall 242. Finger holds 250 may be provided in the edges of the handle main wall 242 in the form of curved cutouts 254 to assist a user in grasping the handle 238 with a finger. As explained in more detail below, the handle 238 may be configured for releasable engagement with a trough 604 of the chassis 100.

Figure 8:
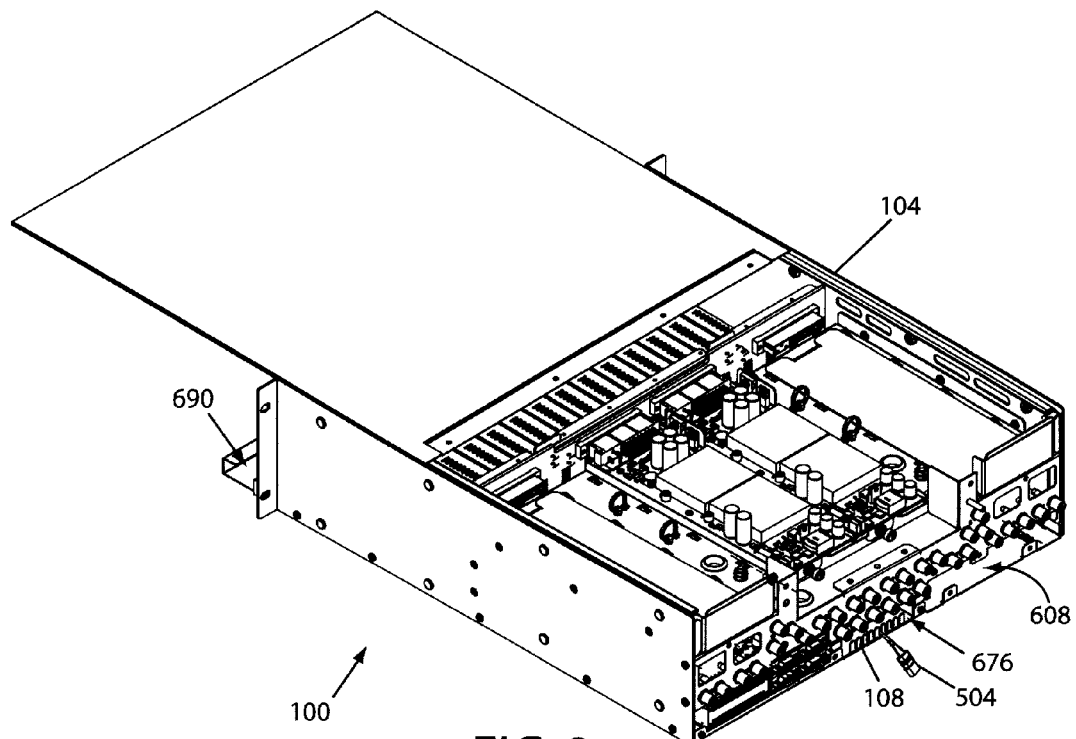
FIG. 8 is an example embodiment of an optical module for use with an electronics chassis.

The fiber fish 108 may interact with a bottom portion of the housing 104 as best shown in FIGS. 6A-6I, which show a bottom assembly 608 of the chassis 100 without the remainder of the housing 104 to prevent obscuring the bottom assembly 608. The bottom assembly 608 may include a bottom wall 612 that serves as the floor of the chassis 100 when the chassis 100 is assembled. Generally parallel upwardly extending sidewalls 616 are provided at the center of the bottom wall 612, and, together with the portion of the bottom wall 612 extending therebetween, define a pathway 620 for movement of the fiber fish 108 through the chassis 100. The pathway 620 is of a size to allow movement of the fiber fish 108 along with fiber optic cable 112 and a connector 504 held by the fiber holder 208. As described in more detail below, the bottom assembly 608 may be provided beneath a module holding assembly 882 when the chassis 100 is assembled so that the pathway 620 extends beneath electronics modules 810 housed within the chassis 100 (FIG. 8).

The sidewalls 616 may be attached to the bottom wall 612 so that gaps 640 are provided therebetween that define slots 624 for receiving the outer edges 258 of the fish body 108. For example, spacer tabs 628 may be provided on a cover assembly 632 which engage the bottom assembly 608 to provide a slot 624 between the sidewalls 616 and the bottom wall 612. The spacer tabs 628 may be configured to fit into a receiving space 634 at the bottom of front walls 636 of the bottom assembly 608 to provide a slot between the bottom wall 612 and the front wall 636. The spacer tabs 628 being of a greater thickness than the thickness of the fiber fish body 204 of the fiber fish 108 so that the outer edges 258 of the fiber fish 108 can fit into the slots 624.

Figure 6A:
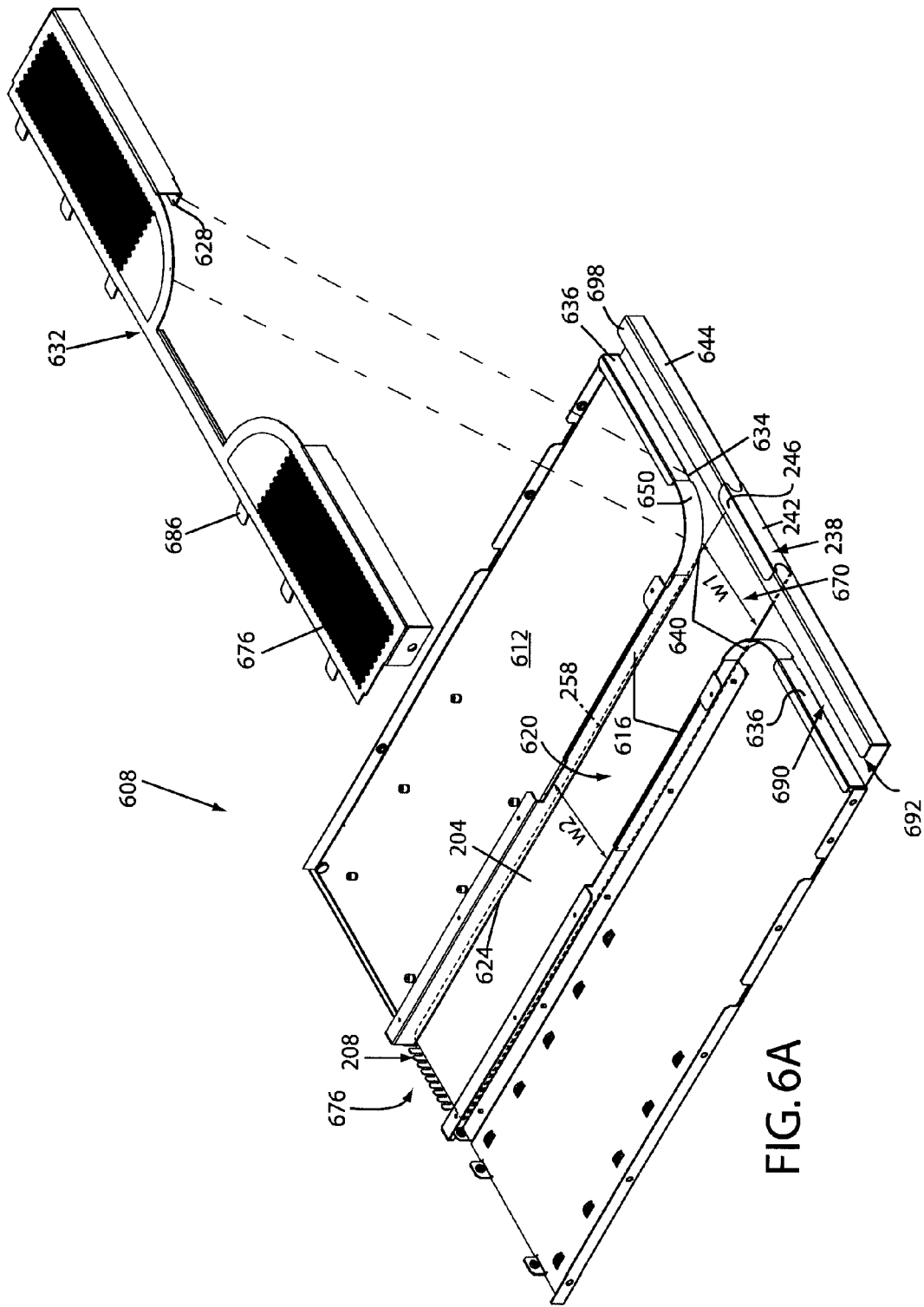
FIGS. 6A-6I show a bottom assembly of a fiber fish and pathway for managing fiber optic cable within an electronics chassis with the fiber fish in various positions.

As seen in FIG. 6A, the body 204 of the fiber fish 108 may have a width w1 that is slightly wider than the space w2 between the sidewalls 616 so that outer edges 258 of the fiber fish body 204 extend within the slots 624 between the sidewalls 616 and the bottom wall 612 of the bottom assembly 608. The fish 108 is slidably movable within the slots 624 along the pathway 620. Left and right curved walls 650 may be provided at a front mouth 670 of the pathway and curve from the sidewalls 616 to left and right housing front walls 636.

Bottom assembly 608 may also include a fiber trough 690 located at the front of the housing 104 for holding fiber optic cable 112. The fiber trough 690 may be defined by the front walls 636, the bottom wall 612 and a trough outer wall 644. The trough outer wall 644 may have a similar profile as that of the handle 240 of the fiber fish 108 and may include a trough tab 698 extending inward from the top of the trough outer wall 644 over the trough 690 to assist in keeping fiber optic cable 112 within the trough 690. The fiber trough 690 has open ends 692 for receiving fiber optic cable 112. The fiber trough 690 intersects the front mouth 670 of the pathway 620 so that fiber optic cable 112 may be routed from the trough 690 into the pathway 620 through the chassis housing 104 and vice versa. The curved sidewalls 650 are shaped to provide a desired bend radius to cables 112 extending between the trough 690 and the pathway 620.

Figure 7A:
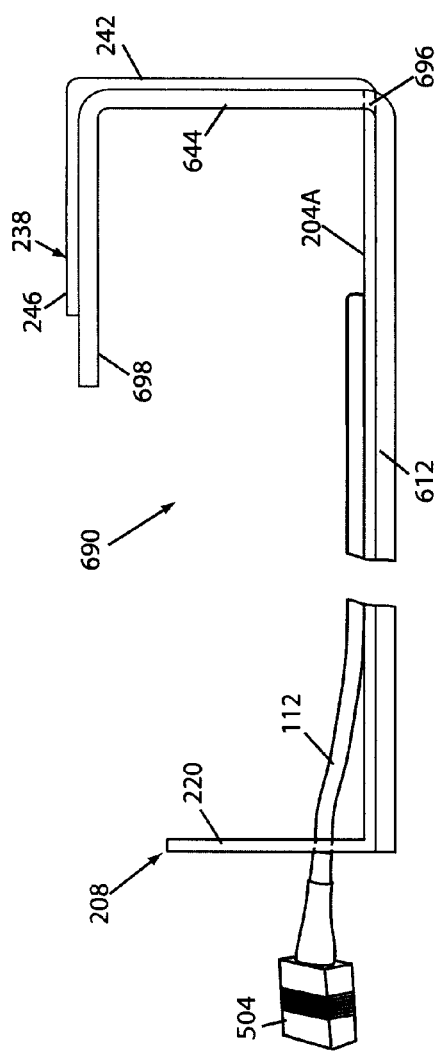
FIGS. 7A-7B show a side view of an example embodiment of a fiber fish and a cable trough for managing fiber optic cable within a chassis.

As shown in FIGS. 6A and 7A the fiber fish handle 238 and trough outer wall 644 have similar profiles and are configured so that the fish handle 238 can releasably engage the trough 690 when the fiber fish 108 is placed in a retracted condition. For example, in an engaged position the handle wall 242 abuts the outer wall 644 of the trough 690 and the handle tab 246 abuts the trough tab 698 so that the handle 238 appears to part of the trough 690. Insignia such as a manufacturer model number, tradename, or other indicia may be provided on the wall 242 of the handle 238 to provide an aesthetically pleasing look. For example, the handle 238 may be made of burnished metal or stainless steel. In the retracted position shown in FIGS. 6A, 7A, and 8 the body 204 of the fiber fish 108 extends through the housing 104 atop the bottom wall 612 so that the fiber holder 208 is located at the rear of the housing 104.

Figure 6B:
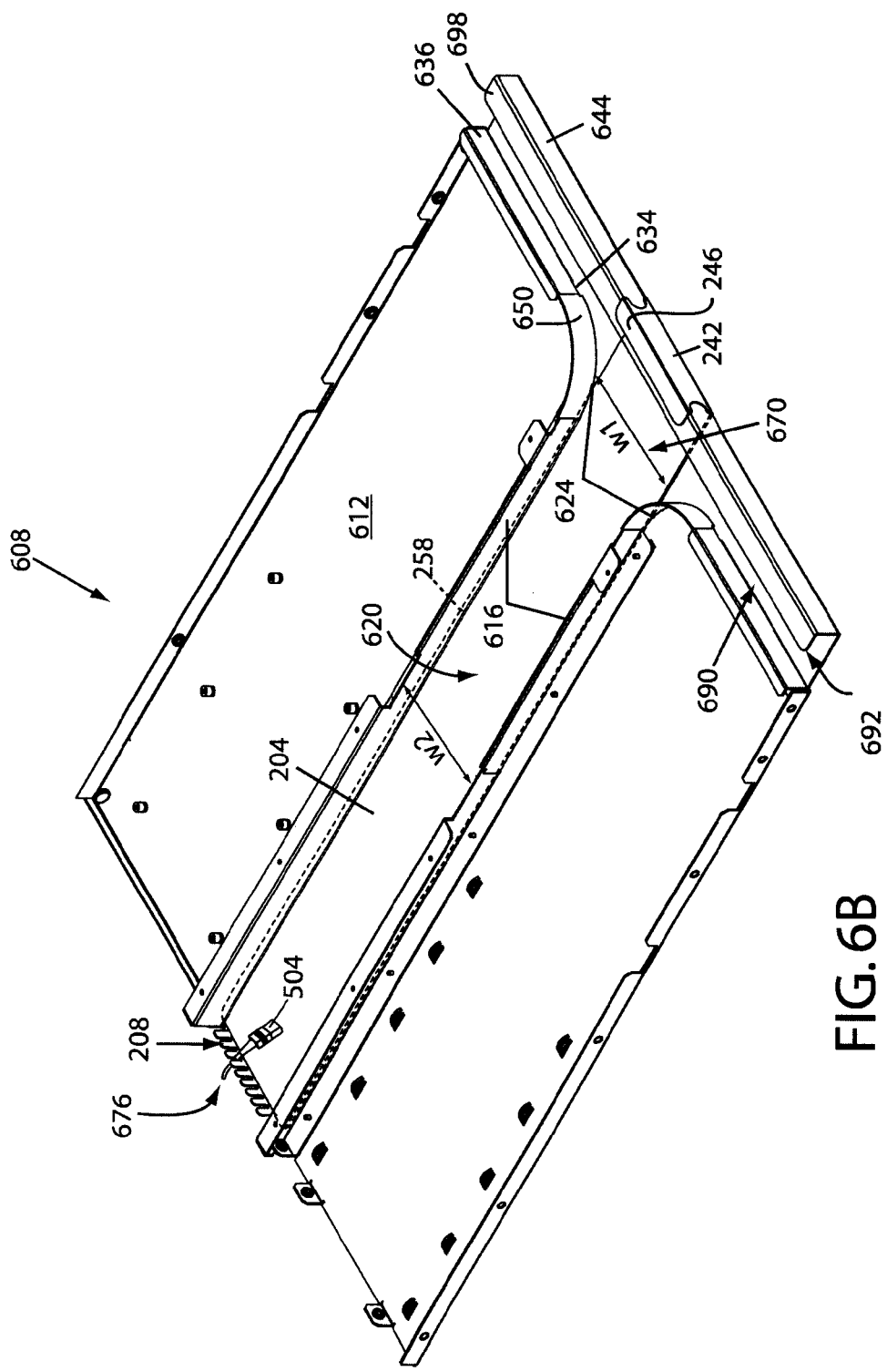
Figure 6C:
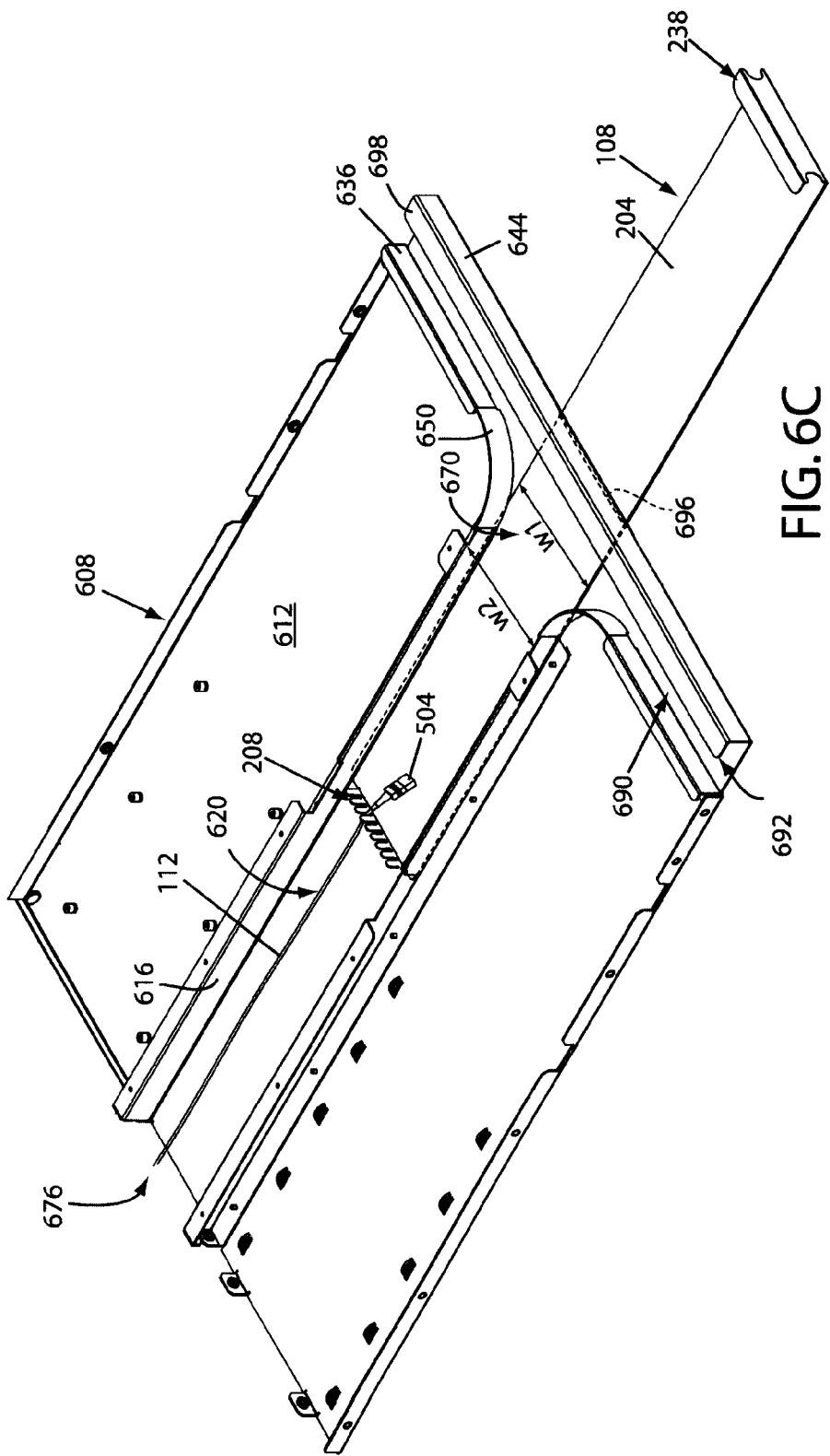
Figure 7B:
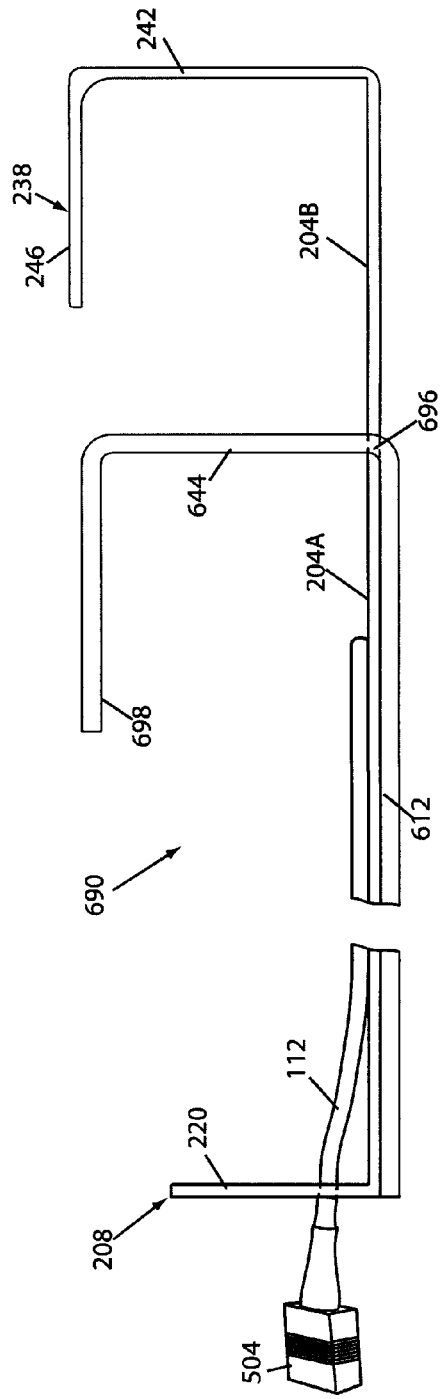

As best seen in FIGS. 6C and 7A-B, an aperture 696 may be provided at the bottom of the outer wall 644 of the trough 690 near the intersection of the trough outer wall 644 and the bottom wall 612. The aperture 696 is sized so that the body 204 of the fiber fish 108 may extend therethrough. For example, as shown in FIG. 7A, the fish body 204 extends through the aperture 696 so that a first portion 204A of the fish body 204 extends atop the bottom wall 612 at a first side of the trough outer wall 644. As shown in FIGS. 6C and 7B, the handle 238 of the fiber fish 108 can be disengaged from the trough 690 and the fiber fish 108 extended from the chassis housing 104 so that a second portion 204B of the body 204 extends on an opposite side of the trough outer wall 644.

Figure 9:
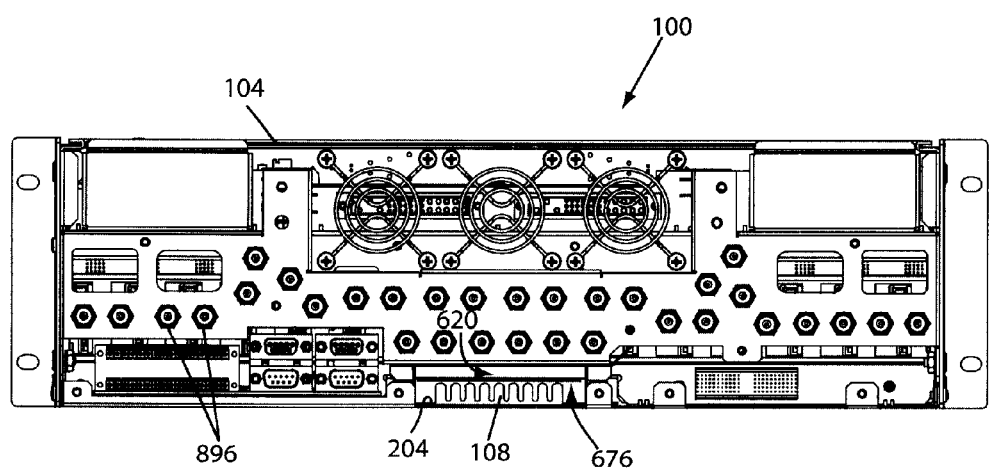
FIG. 9 shows an example embodiment of an electronics chassis and an electronics module.

In the initial retracted condition shown in FIGS. 6A and 7A, the handle 238 of the fiber fish 108 is engaged with the fiber trough 290 and the fiber holder 210 is located at the rear of the housing 104. In this position the fiber holder 208 is accessible at the rear of the housing 104 through a rear mouth 676 (FIGS. 8 and 9). As shown in FIG. 6B, fiber optic cable 112 and an associated connector 504 may be placed in one of the receiving troughs 234 of the fiber holder 208 at the rear mouth 676.

Figure 6D:
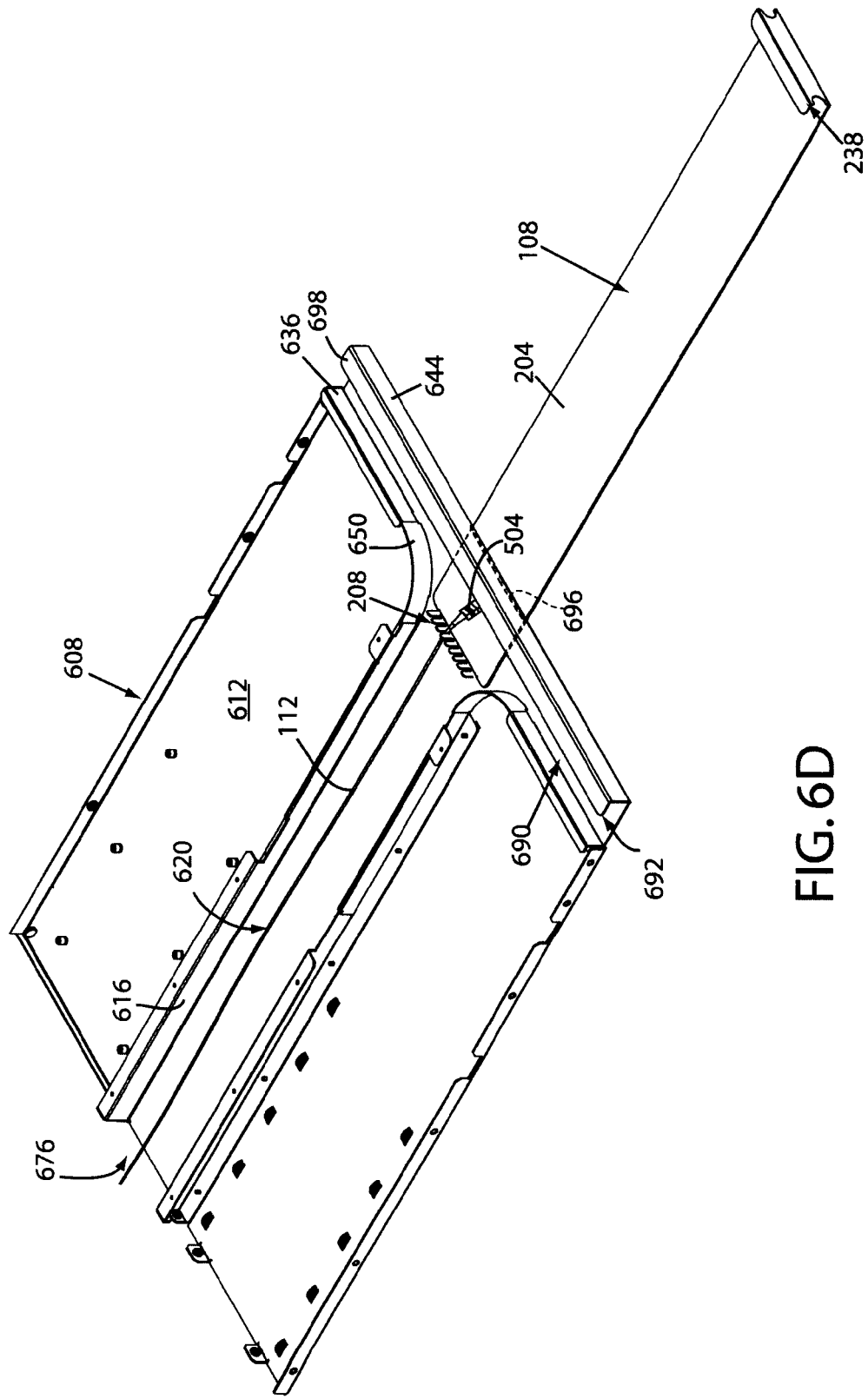
Figure 6E:
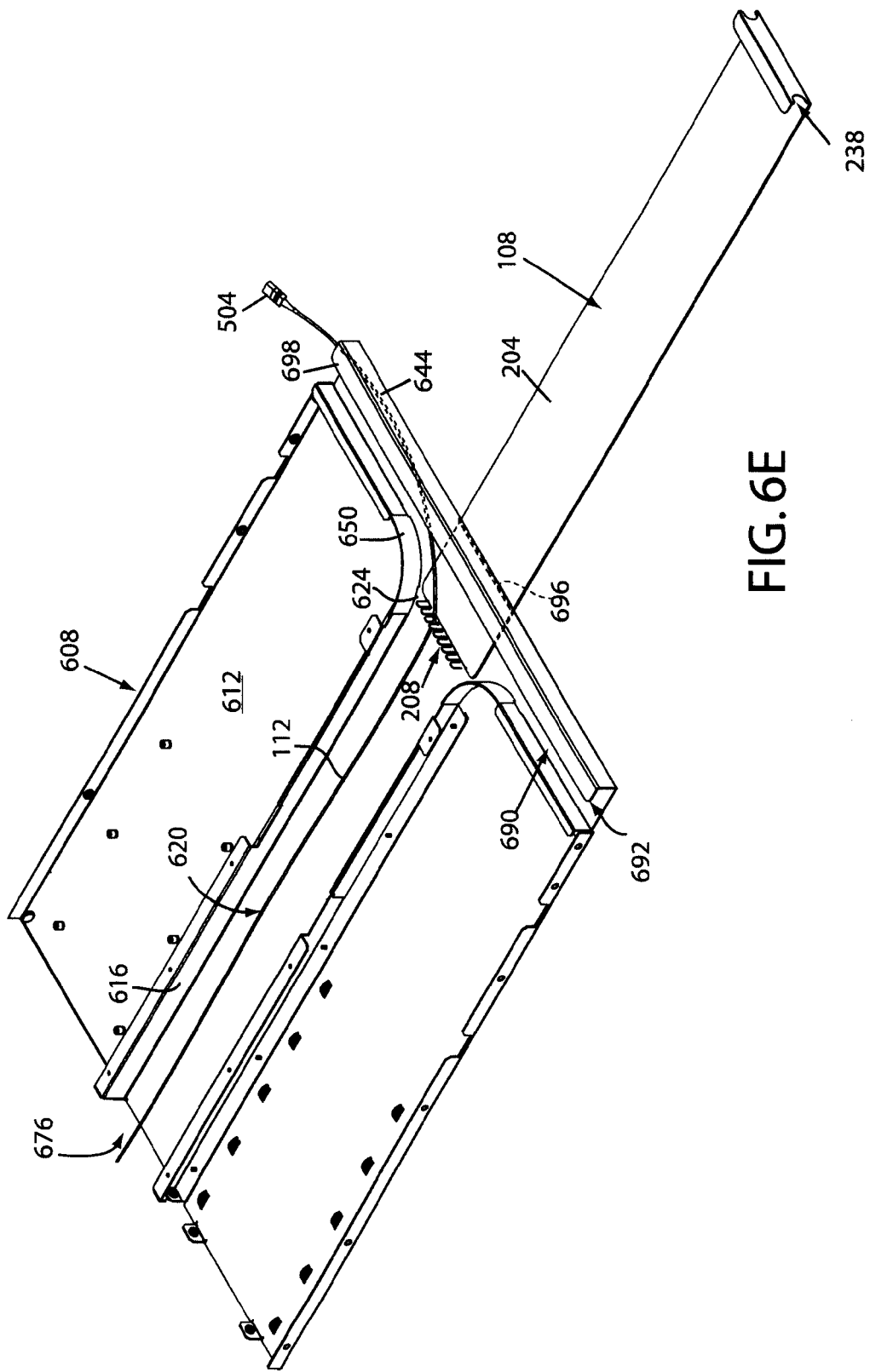
Figure 6F:
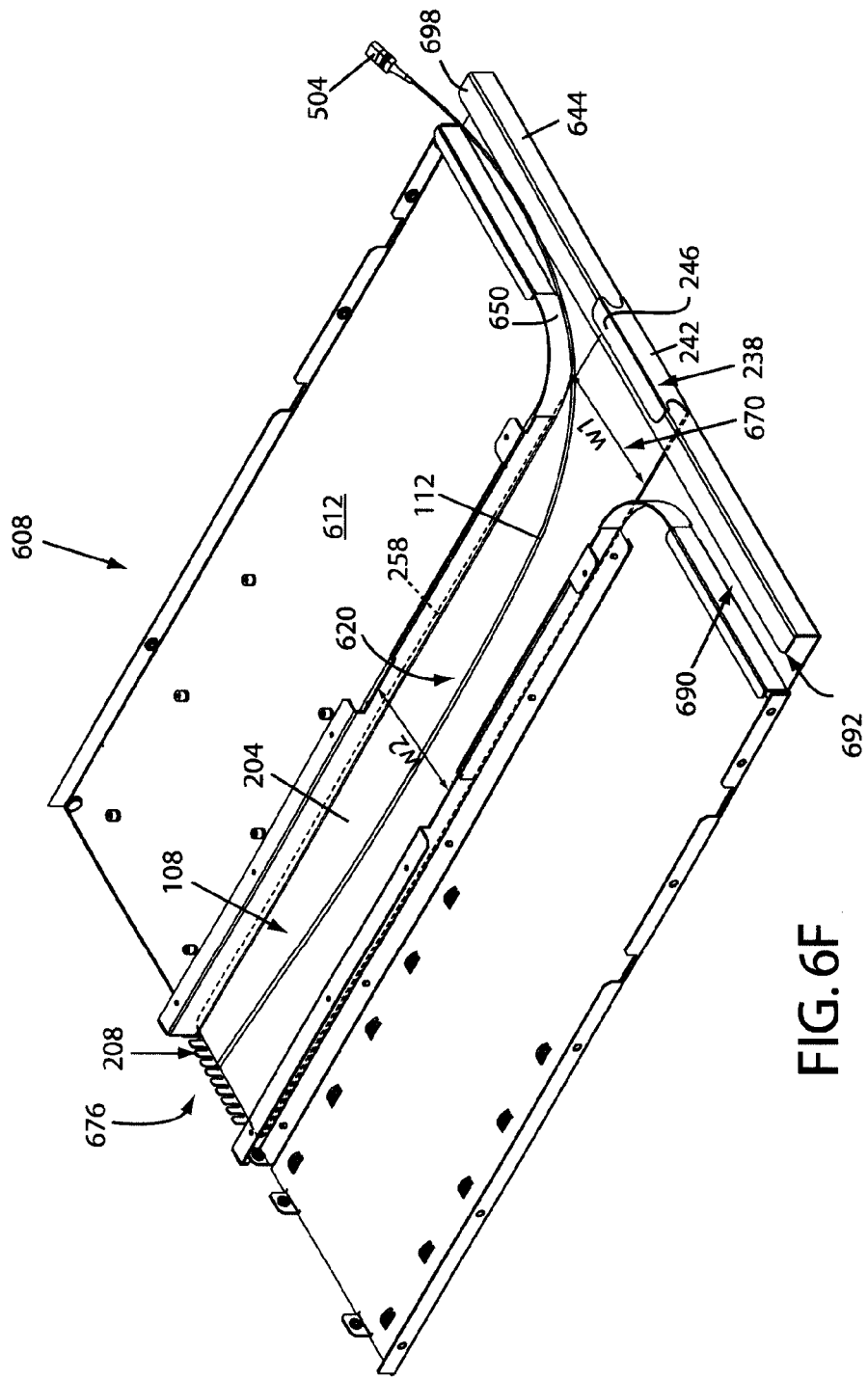

The fiber fish 108 can then be disengaged from the fiber trough 690 and slid along the pathway 620 to an extended position so that a portion 204B of the fish body 204 extends outwardly from the chassis 100 (FIG. 7B). When the fiber fish 108 is extended from the housing 104, the fiber holder 108 moves from the rear of the housing 104 toward the front of the housing 104 and into the fiber trough 690 as shown in FIGS. 6C-D, thereby moving the connector 504 and fiber optic cable 112 held by the fiber holder 208 through the housing 104 to the front of the chassis 100. When the fiber holder 208 is positioned in the open-topped fiber trough 690 as shown in FIG. 6D, the connector 504 and fiber optic cable 112 are readily accessible from the front of the chassis 100 at front mouth 670. The cable 112 and connector 504 can then be routed to a desired destination, such as out of an open end 692 of the trough 690 as shown in FIG. 6E. The curved wall 650 serves as a bend radius to prevent the cable 112 from being bended too sharply. The fiber fish 108 can then be returned to a contracted position with the handle 240 engaged with the trough 290 (FIG. 6F).

Figure 6G:
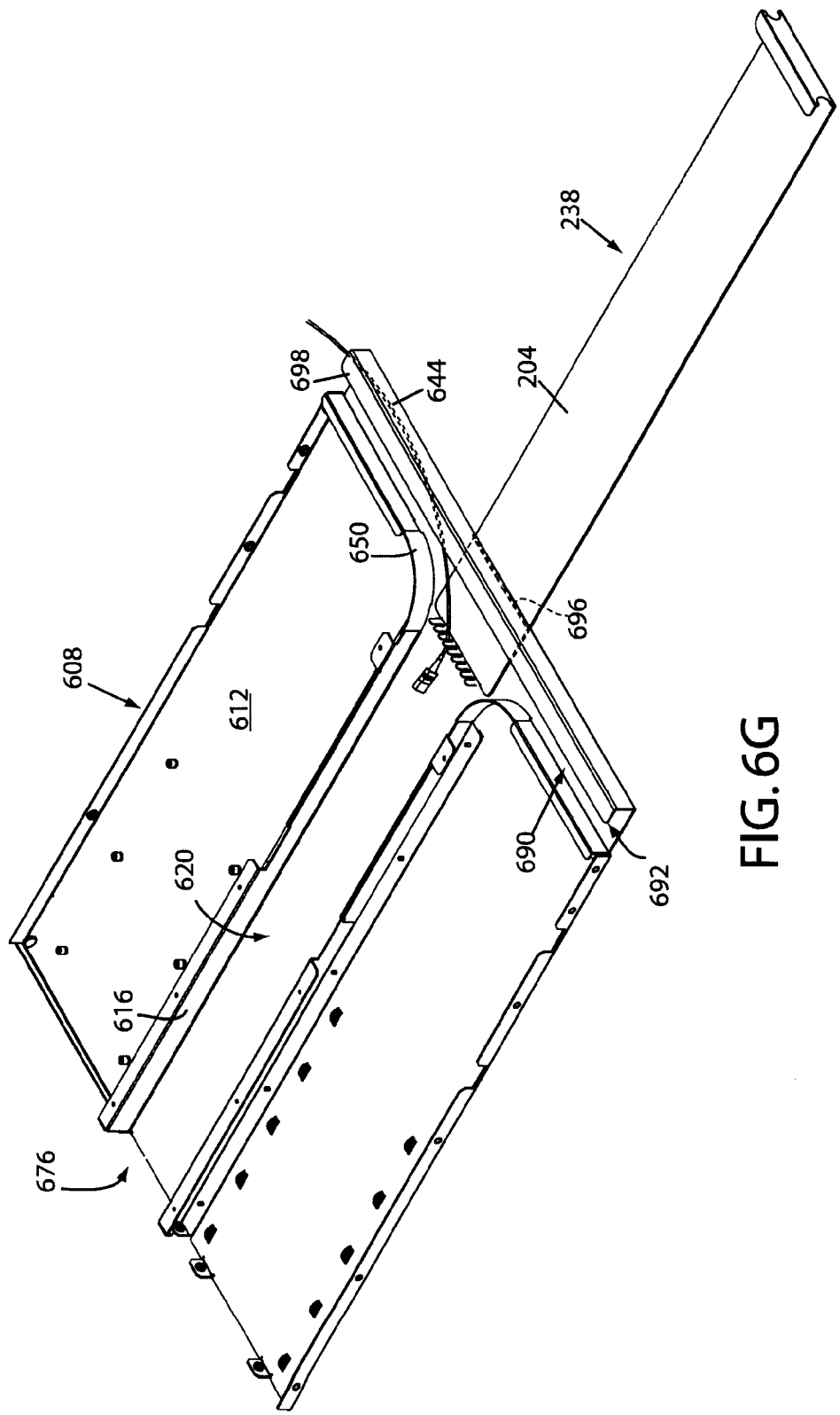
Figure 6H:
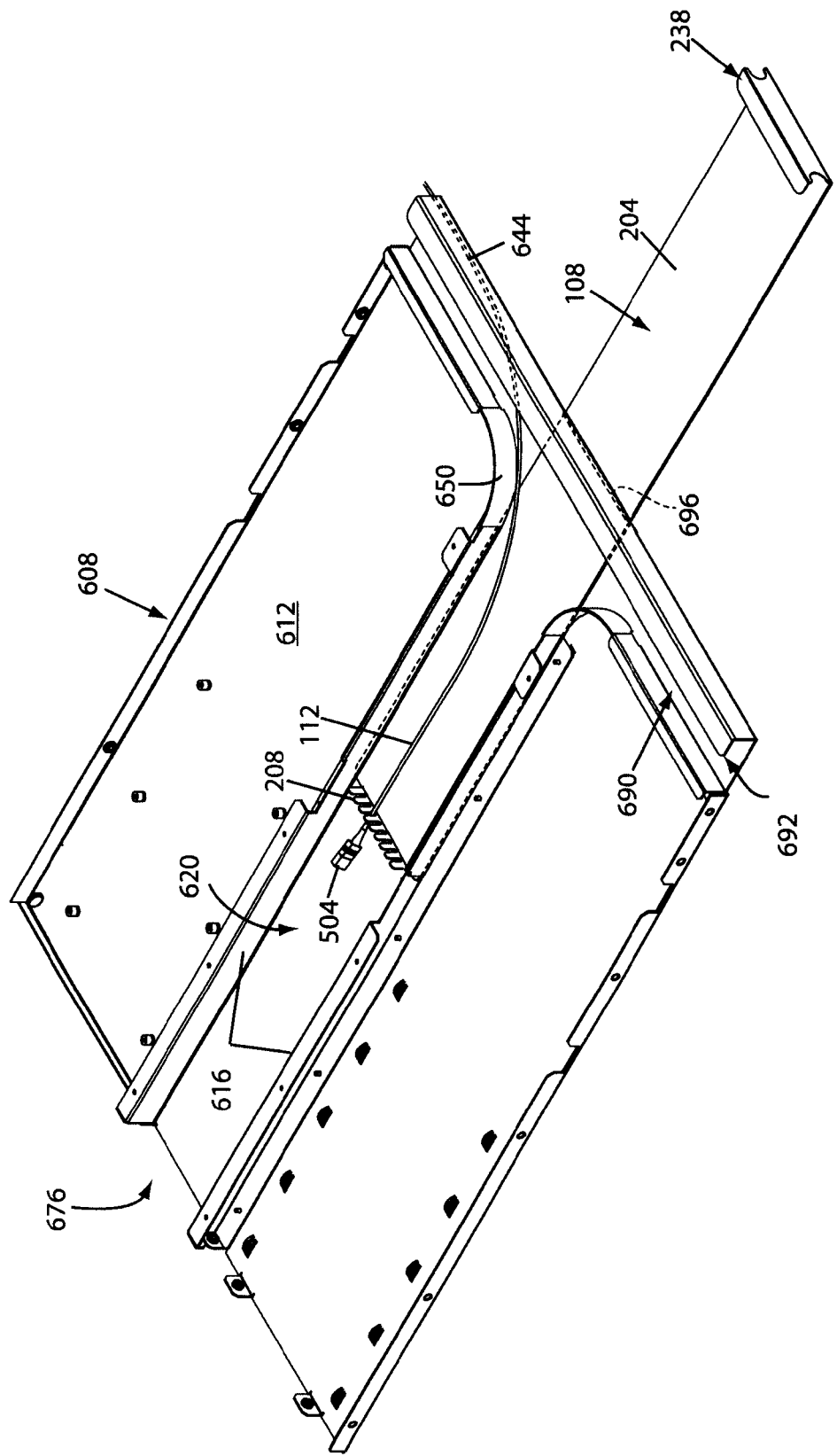
Figure 6I:
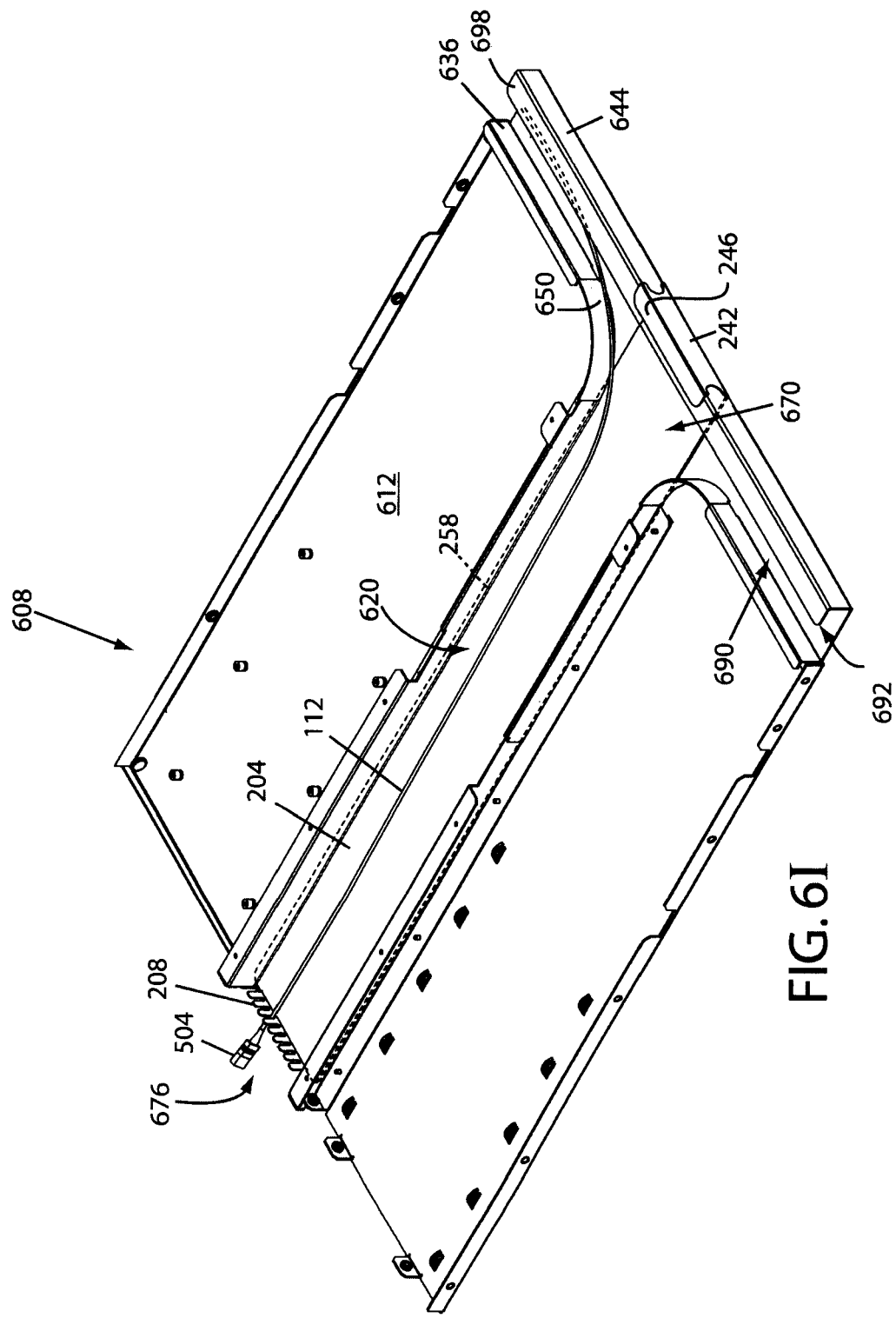

Fiber optic cable 112 may also be moved from the front of the chassis 100 to the rear of the chassis 100 by the method shown in FIGS. 6G-6I. Starting from an initial contracted position shown in FIG. 6A, an operator may disengage the handle 240 from the trough 290 and extend the fiber fish 108 away from the housing 104 so that the fiber holder 208 moves along the pathway 620 from the rear of the housing to a front mouth 670 at the trough 290 where it is accessible by an operator (FIG. 6G). A user can then place a fiber optic cable 112 in a receiving trough 234 of the fiber holder 208 with a connector 250 placed on the opposite side of the fish fingers 220 (FIGS. 6B and 7B). The fiber fish 108 may then be moved along the pathway 620 (FIG. 6H) back to the rear of the chassis 100 to a retracted position so that the handle 238 engages the trough 690 (FIGS. 6I and 7B). The sidewalls 650 provide a bend radius to the fiber optic cable 112 as it is moved to the rear of the chassis 100. The fiber optic cable 112 and connector 504 are then accessible at the rear mouth 676 of the pathway 620 (FIG. 8) and the connector 504 can be routed to a desired location. For example, a chassis 100 may serve as a power interconnect between other chassis (not shown).

The fiber fish 108 can be used to move fiber optic cable 112 through the housing even when there is other fiber optic cable 112 already extending through the pathway 290. The movement of the fiber fish 108 may be limited by the engagement of the fish handle 238 with the trough 690 outer wall 644 so that cable 112 within the trough 690 is not pinched by the fiber fish 108. The receiving troughs 234 (FIG. 5) of the fiber holder 208 allow the fish 108 to provide effective cable management even as the fiber fish 108 is moved through the chassis housing 104. For example, fiber optic cable 112 may remain in the receiving troughs 234 to keep the cable 112 in an orderly arrangement and prevent the cable from being pinched by movement of the fiber fish 108. Fiber optic cables 112 that have previously been moved by the fiber fish 108 may remain in their respective troughs 234 as the fiber fish 108 is moved along the pathway 620. As previously mentioned, the troughs 234 may have smooth surfaces to prevent cutting of the fiber optic cables 112 and the chassis housing 104 provided with curved walls 650 to provide a bend radius to prevent excessive bending of the cables 112.

Figure 10:
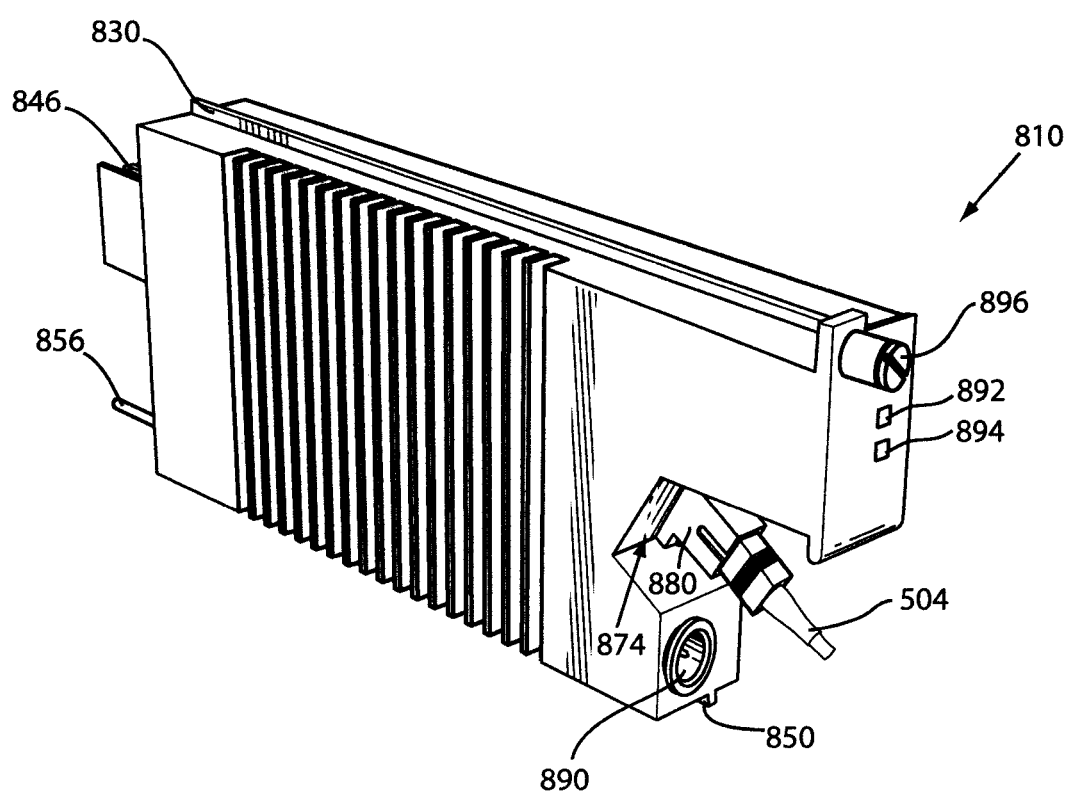
FIG. 10 is a rear perspective view of an electronics chassis with fiber management.
Figure 11:
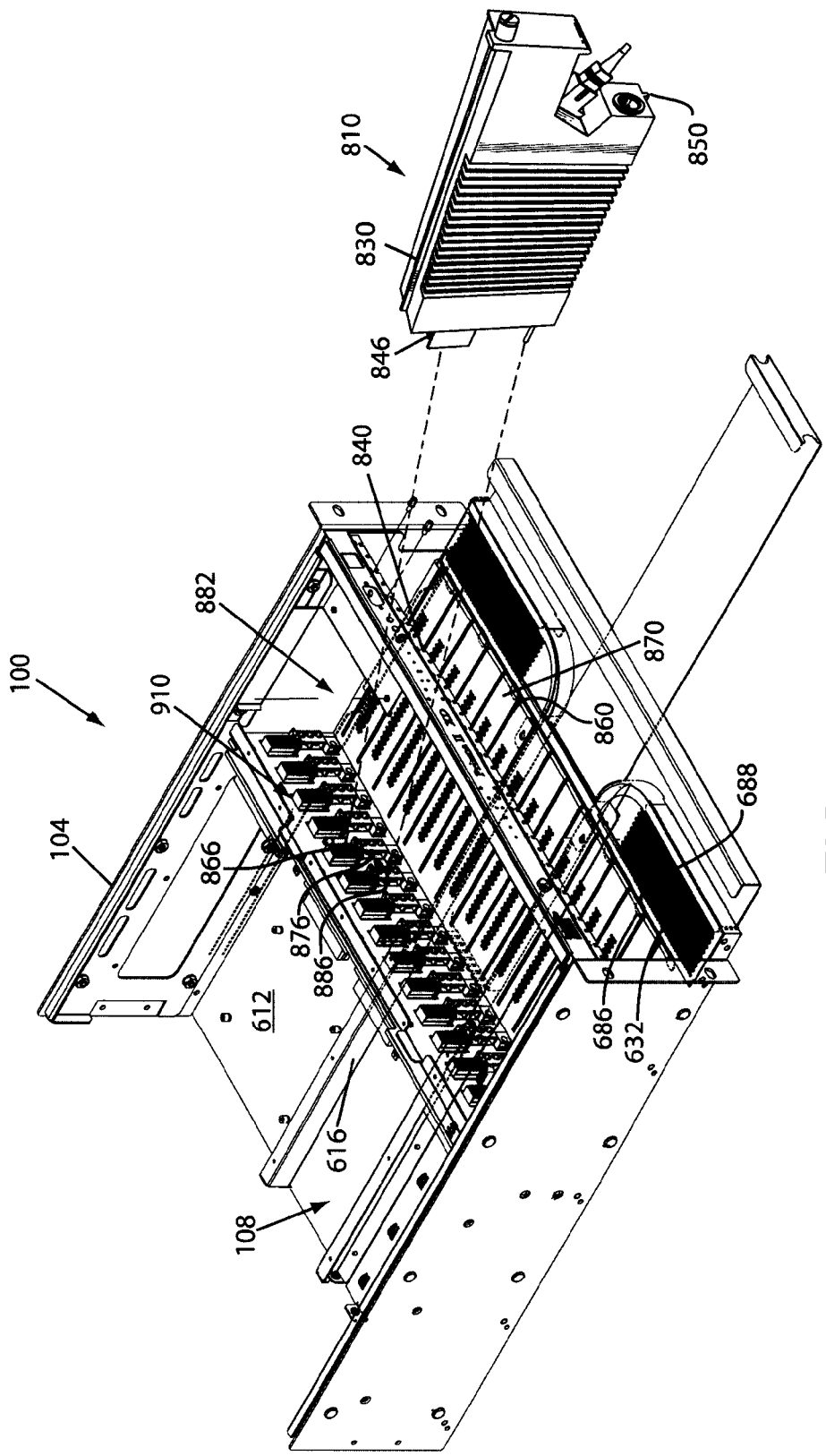
FIG. 11 is a rear view of an electronics chassis with fiber management.
Figure 12:
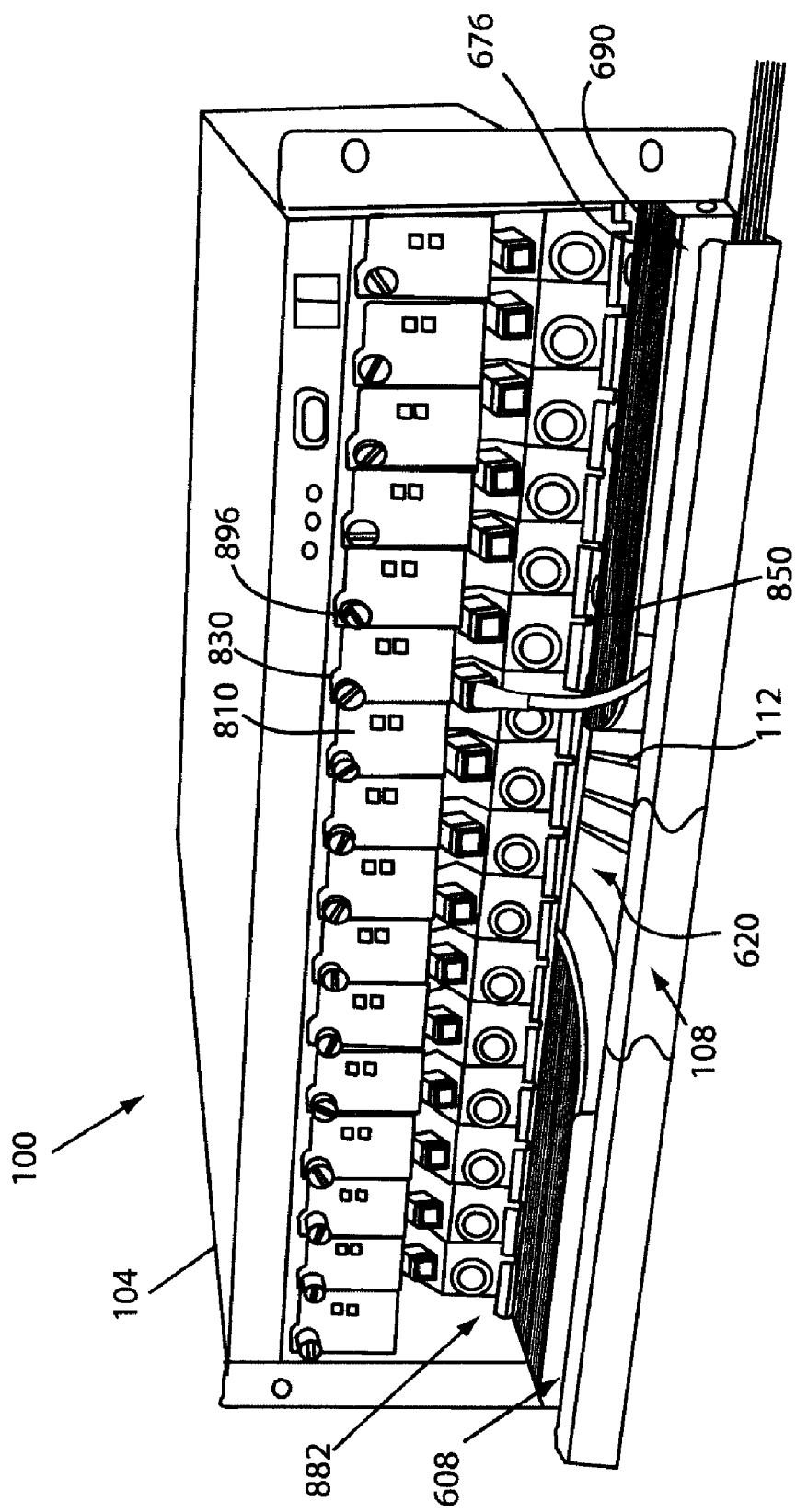
FIG. 12 shows a perspective view of an example chassis for managing fiber optic cable.

As shown in FIGS. 10-12, the chassis housing 104 may be configured to receive and retain a plurality of electronics modules 810. The modules 810 may be similar to the modules disclosed in U.S. patent application Ser. No. 11/125,993 which is incorporated by reference in its entirety herein. The modules 810 may be similar to electronics modules sold under the name PRISMA XD™ available from Scientific-Atlanta, Inc. The module 810 may include the electronic functionality of any known electronics module. In the example embodiment shown in FIG. 10, the module 810 includes on its front an optical bulkhead 874 having an angled laser aperture optical output connector 880 angled at about 45 degrees for connection with a fiber optic cable connector 504. An RF test port 890 may also be provided.

The modules 810 may also include indictors such as an alarm indicator 892 and a laser indicator 894. A fastener, such as a thumb screw 896, may be provided for securing the module 810 to the chassis housing 104. In the example embodiment shown in FIGS. 1 and 12, the chassis 100 has a height of 3RU and houses 16 high density modules 810. The chassis 10 may be suitable for use in a 19-inch wide standard rack and may be stacked 15 in a rack (not shown).

As best seen in FIGS. 11 and 12, the modules 810 may be of a height dimension that substantially corresponds to a slot within the chassis 100 so that a top guide rail 830 of the module 810 is received in a top guide slot 840 of the chassis 100 and a lower guide rail 850 of the module 810 is received in a lower guide slot 860 of the chassis 100. The chassis 10 may include a plurality of upper 840 and lower 860 slots for engaging with upper 830 and lower 850 rails on an electronics module 810. A plurality of support pieces 870 may be provided to support the modules 810 within the chassis 10. The support pieces 870 may be spot-welded into place to provide spaces therebetween that define the lower slots 860 for receiving the lower rail 850 of a module 810.

The rear of the modules 810 may be configured for mating with a backplane 910 within the chassis 100. The module 810 may include a first plurality of male electrical connectors 846 and a plurality of female RF connectors (not shown) and a male grounding connector 856. The plurality of electrical connectors 846, female RF connectors, and the male grounding connector 856 are utilized to mechanically and electrically couple a module 810 to a backplane 910 as shown in FIGS. 11 and 12. The backplane 910 may include a first plurality of female electrical connectors 866 and a plurality of male RF connectors 876 and a female grounding connector 886 for mechanically and electrically coupling a module 810, to the back plane 910. Thus, the RF connection for each module 810 is made by a high-reliability blind-mate connection on the inside backplane 910, eliminating the need to physically connect RF cables to each module 810 and thereby providing an easy plug and play arrangement. A plurality of RF connectors 896 are provided on the rear of the housing 104 as seen in FIG. 9. The chassis 100 thus allows for optical connections to be made at the front of the chassis 100 and RF connections to be made at the rear of the chassis 100.

Figure 13:
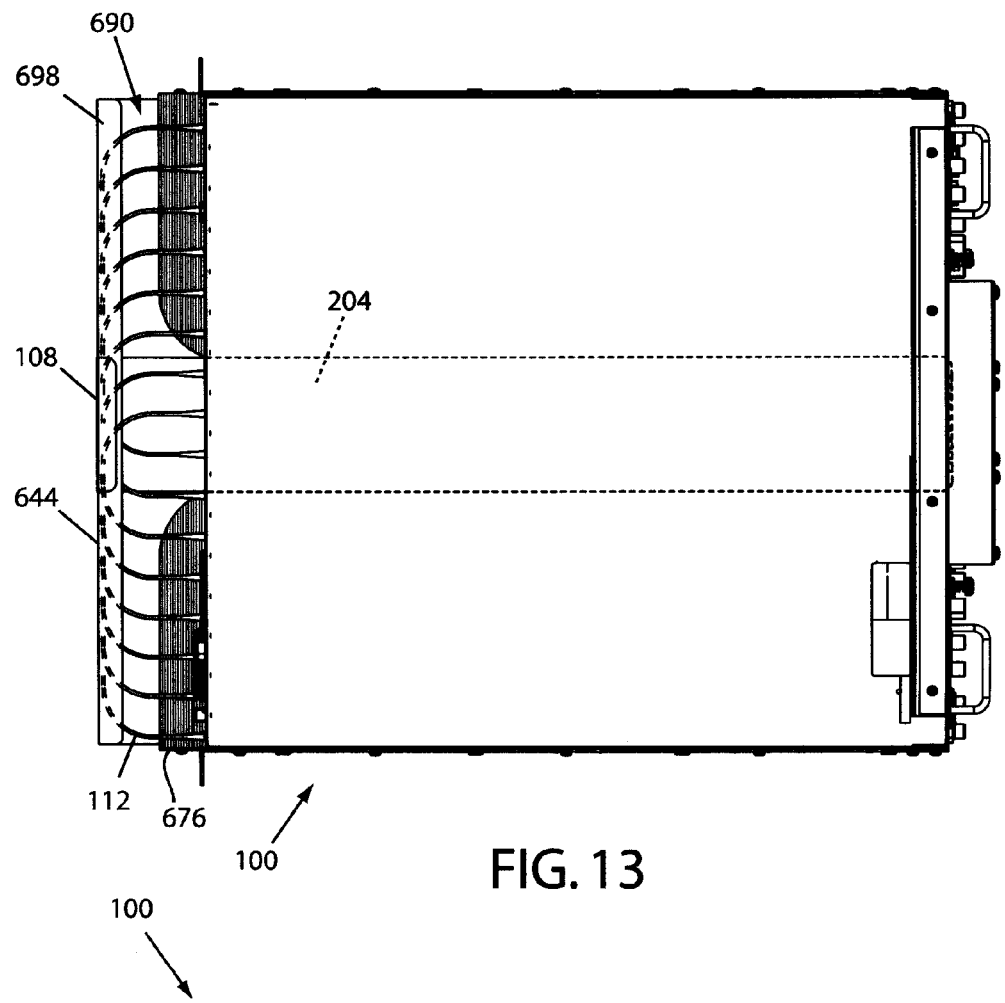
FIG. 13 shows a top view of an example chassis for managing fiber optic cable.
Figure 14:
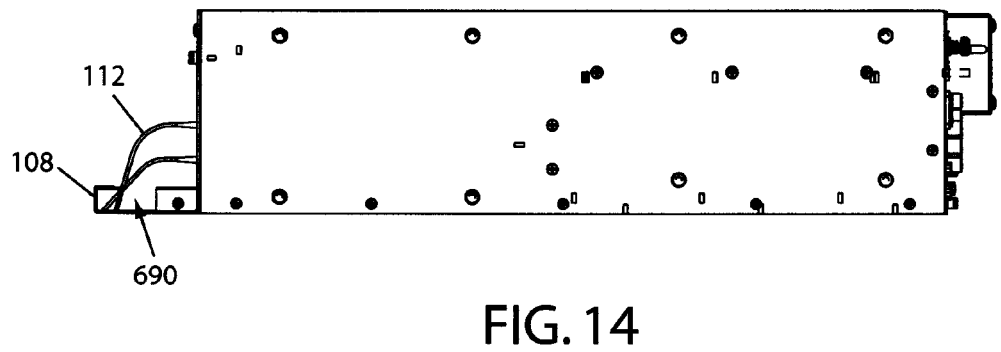
FIG. 14 shows a right side view of an example chassis for managing fiber optic cable.

As seen in FIGS. 6A, 11 and 12 the cover assembly 632 may include perforated portions 676 that act as an air intake for the modules 810 when housed in the chassis 100. The cover assembly 632 may also include tabs 686 that are received in slots 688 below the support pieces 870. FIGS. 13 and 14 show a top and side view, respectively, of the chassis 100 with an integrated fiber fish 108 in a retracted condition so that the handle 238 of the fiber fish 108 is generally flush with the outer wall 644 of the cable trough 690 and fiber optic cable 112 connected to modules within the chassis 100.

The chassis 100 thus includes an integrated fiber fish 108 that is a self-contained tool designed into the chassis 100. The integrated fish 108 provides an operator with the ability to route fiber optic cable 112 between the front and rear of the chassis easily and effectively without the need of specialty tools. The fiber fish 108 allows a means for making fiber optic cable accessible from the front and rear of the chassis 100.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An apparatus comprising:
   a housing configured to house electronics, the housing having a fiber trough;
   a pathway extending through the housing; and
   a fiber fish coupled to the housing and movable relative to the fiber trough, the fiber fish configured to move fiber optic cable along the pathway;
   wherein the fiber trough is integral with the housing and intersects the pathway to allow fiber optic cable to be routed from the trough through the pathway.

2. The apparatus of claim 1, further comprising a curved wall between the pathway and the trough configured to provide a bend radius for fiber optical cable routed between the trough and the pathway.

3. An apparatus, comprising:
   a housing configured to house electronics, the housing having a fiber trough;
   a pathway extending through the housing; and
   a fiber fish coupled to the housing and movable relative to the fiber trough, the fiber fish configured to move fiber optic cable along the pathway;
   wherein the fiber fish comprises:
   an elongated body;
   a fiber holder provided at a first end of the body, the fiber holder configured to releasably hold fiber optic cable, the fiber holder providing a path through the fiber holder to allow fiber to extend through the first end of the body.

4. The apparatus of claim 3, wherein the pathway extends from a front of the housing to a rear of the housing to allow movement of the fiber optic cable held by the fiber holder between the trough at the front of the housing and the rear of the housing.

5. The apparatus of claim 4, further comprising a mouth at the front of the housing to allow access at the front of the housing to fiber optic cable held by the fiber fish.

6. The apparatus of claim 4, further comprising a mouth at a rear of the housing to allow access at a rear of the housing to cable held by the fiber fish.

7. The apparatus of claim 3, wherein the pathway comprises:
   a bottom wall; and
   two opposing sidewalls.

8. The apparatus of claim 7, wherein the pathway further comprises a curved wall configured to provide a bend radius to fiber optic cable extending through the pathway.

9. The apparatus of claim 3, further comprising:
   a sidewall located at a side of the pathway; and
   a slot is provided at the sidewall to movably receive the body of the fiber fish.

10. The apparatus of claim 3, further comprising an aperture in the housing configured to allow movement of the fiber fish therethrough to extend from the housing and under the fiber trough.

11. The apparatus of claim 10, wherein the aperture is in a bottom wall of the housing at the fiber trough.

12. The apparatus of claim 3, wherein the fiber fish further comprises a handle at a second end of the body, the handle conformable to the fiber trough.

13. The apparatus of claim 3, wherein the fiber fish further comprises a handle at a second end of the body, the handle configured to contact and releasably engage a front of the housing.

14. The apparatus of claim 3, wherein the fiber fish further comprises a handle at a second end of the body, the handle is configured to contact and releasably engage a fiber trough at a front of the housing.

15. The apparatus of claim 12, wherein the handle is exterior to the housing.

16. The apparatus of claim 3, wherein the fiber fish is movable between a first position in which the fiber holder at a rear of the housing and a second position in which the fiber holder is at a front of the housing.

17. The apparatus of claim 16, wherein the fiber holder is accessible at the rear of the housing in the first position.

18. The apparatus of claim 16, wherein the fiber holder is positioned at the fiber trough in the second position.

19. The apparatus of claim 3, wherein the fiber fish is slidably movable along the pathway.

20. The apparatus of claim 3, wherein the fiber holder comprises a plurality of spaced apart fingers that form receiving troughs for releasably holding the fiber optic cable extending beyond the first end of the body.

21. A fiber fish comprising:
   an elongated body;
   a fiber holder at a first end of the elongated body, the fiber holder configured to provide a path for fiber optic cable to extend through the first end of the fiber holder and releasably hold the fiber optic cable extending through the first end; and
   a handle at a second end of the elongated body, the handle configured to releasably engage a chassis housing.

22. The fiber fish of claim 21 wherein the elongated body comprises a generally flat metal sheet.

23. The fiber fish of claim 21 wherein the fiber holder comprises a plurality of spaced apart fingers.

24. The fiber fish of claim 21 wherein the handle comprises:
   a generally vertical main wall extending from the elongated body; and
   a generally horizontal tab extending from the main wall;
   wherein the main wall and the horizontal tab are configured to releasably engage and conform to a trough of an electronics chassis.

* * * * *